US012667041B2

(12) United States Patent
Hynek et al.

(10) Patent No.: US 12,667,041 B2
(45) Date of Patent: Jun. 30, 2026

(54) IN-CONTAINER SEED TREATMENT APPLICATOR

(71) Applicant: PIONEER HI-BRED INTERNATIONAL, INC., Johnston, IA (US)

(72) Inventors: Joe Hynek, Des Moines, IA (US); Andrew Jarvis, Des Moines, IA (US)

(73) Assignee: PIONEER HI-BRED INTERNATIONAL, INC., Johnston, IA (US)

( * ) Notice: Subject to any disclaimer, the term of this patent is extended or adjusted under 35 U.S.C. 154(b) by 0 days.

(21) Appl. No.: 18/863,443

(22) PCT Filed: Mar. 10, 2023

(86) PCT No.: PCT/US2023/064125

§ 371 (c)(1),
(2) Date: Nov. 6, 2024

(87) PCT Pub. No.: WO2023/230388

PCT Pub. Date: Nov. 30, 2023

(65) Prior Publication Data

US 2025/0301938 A1 Oct. 2, 2025

Related U.S. Application Data

(60) Provisional application No. 63/365,323, filed on May 25, 2022.

(51) Int. Cl.
*A01C 1/06* (2006.01)

(52) U.S. Cl.
CPC ..................................... *A01C 1/06* (2013.01)

(58) Field of Classification Search
CPC ....................................................... A01C 1/06
See application file for complete search history.

(56) References Cited

U.S. PATENT DOCUMENTS

| | | | |
|---|---|---|---|
| 4,657,773 A | 4/1987 | Mueller | |
| 5,891,246 A | 4/1999 | Lund | |
| 6,582,516 B1 | 6/2003 | Carlson | |
| 6,706,989 B2 | 3/2004 | Hunter et al. | |

(Continued)

FOREIGN PATENT DOCUMENTS

| | | | |
|---|---|---|---|
| CA | 3117717 A1 | 5/2020 | |
| CN | 208270444 U | * 12/2018 | |

(Continued)

OTHER PUBLICATIONS

International Search Report and Written Opinion for International Application No. PCT/US2023/064125, mailed Feb. 7, 2024, 11 Pages.

(Continued)

*Primary Examiner* — Joshua D Huson
*Assistant Examiner* — Alanna K Peterson

(57) ABSTRACT

A sealed seed treatment apparatus intended to provide a method for surface treatment of seeds through the injection of a container of seeds. The invention is capable of creating an efficient coating process with scanners and sensor to measure accurate dosing amounts for each injection needle. The apparatus contains a recirculation tank to conserve and control the seed treatment product to limit waste.

26 Claims, 12 Drawing Sheets

(56) References Cited

U.S. PATENT DOCUMENTS

| | | | |
|---|---|---|---|
| 7,263,899 B2 | 9/2007 | Luehrs | |
| 7,502,113 B2 | 3/2009 | Deppermann et al. | |
| 7,600,642 B2* | 10/2009 | Deppermann | G01N 35/02 |
| | | | 209/552 |
| 7,611,842 B2 | 11/2009 | Deppermann et al. | |
| 7,938,284 B2 | 5/2011 | Goldman et al. | |
| 7,998,669 B2 | 8/2011 | Deppermann et al. | |
| 8,458,953 B2 | 6/2013 | Hunter et al. | |
| 8,504,211 B2* | 8/2013 | Applegate | A01C 21/00 |
| | | | 700/285 |
| 8,621,780 B2* | 1/2014 | Ochampaugh | A01C 1/00 |
| | | | 47/57.6 |
| 8,887,938 B2 | 11/2014 | Goldman et al. | |
| 9,313,939 B2 | 4/2016 | Hood et al. | |
| 9,861,028 B2 | 1/2018 | Reineccius et al. | |
| 10,235,644 B2 | 3/2019 | Reineccius et al. | |
| 11,291,154 B2 | 4/2022 | Reineccius et al. | |
| 2006/0255060 A1* | 11/2006 | Miller | A01C 1/08 |
| | | | 222/63 |
| 2009/0125552 A1 | 5/2009 | Hunter et al. | |
| 2010/0263274 A1 | 10/2010 | Corak et al. | |
| 2012/0183675 A1 | 7/2012 | Reineccius et al. | |
| 2013/0121101 A1* | 5/2013 | Ochampaugh | B01F 33/8052 |
| | | | 366/182.1 |
| 2018/0288933 A1* | 10/2018 | Reineccius | A01C 1/06 |
| 2020/0288627 A1 | 9/2020 | Feiner et al. | |
| 2020/0399114 A1* | 12/2020 | Pullins, II | B67D 7/74 |
| 2021/0289686 A1* | 9/2021 | Reichenberger | A01C 1/08 |
| 2022/0039310 A1* | 2/2022 | Johnson | A01C 1/06 |

FOREIGN PATENT DOCUMENTS

| | | | | |
|---|---|---|---|---|
| CN | 211043186 U | * | 7/2020 | |
| CN | 215086601 U | | 12/2021 | |
| DE | 2657254 A1 | | 6/1978 | |
| DE | 4411058 A1 | | 10/1995 | |
| EP | 3634105 B1 | | 4/2022 | |
| KR | 101857213 B1 | | 5/2018 | |
| KR | 20220003759 A | | 1/2022 | |
| WO | WO-2008016368 A1 | * | 2/2008 | A01C 1/06 |
| WO | WO-2018213700 A1 | | 11/2018 | |
| WO | WO-2021067433 A1 | | 4/2021 | |

OTHER PUBLICATIONS

International Preliminary Report on Patentability for International Application No. PCT/US2023/064125, mailed Dec. 5, 2024, 10 Pages.
Office Action for Chile Application No. 202403557, mailed Oct. 14, 2025, 18 Pages.
Extended European Search Report for European Application No. 23812673.4, mailed Mar. 30, 2026, 13 Pages.

* cited by examiner

Ram Image

*510*

AOI identified and cropped

Color/pixel analysis treatment density

IN-CONTAINER SEED TREATMENT APPLICATOR

FIELD OF THE INVENTION

The present invention relates to an apparatus for surface treatment of seeds built to inject seed treatment product into containers of seed.

BACKGROUND

Seeds that are planted for agricultural and other purposes are often treated prior to planting. The treatments may accomplish many different purposes including targeting bacteria, molds, and fungus that have contaminated the seeds or that may be present in the soil. Seed treatment also may deter or prevent insects or other animal pests that would target sown or newly germinated seed from directly causing damage to the seed or introducing pathogens, including viruses, directly into the seed.

SUMMARY OF INVENTION

The apparatus of the described herein is directed towards the automated application of seed treatment to containers of seeds by means of injection. Such containers may be permanently or removably sealed, and the apparatus is specifically useful for applying seed treatment to seed packaged within the Buckling Clamshell Container for Automated Aliquot and Dispersal Processes described in U.S. Pat. No. 7,938,284, the disclosure of which is incorporated by reference herein. These containers are particularly useful with the Automated Research Planting System, Method and Apparatus described in U.S. Pat. No. 8,639,383, the disclosure of which is incorporated by reference herein, but is useful in conjunction with other systems involving the distribution of research seed such as the cassette system or trays shown in U.S. Pat. No. 11,304,356.

The container seed treatment apparatus provides a high throughput automated and effective process of injecting one or more containers through the use of injection needles monitored by a micro flowmeter. When used with the clamshell containers described in U.S. Pat. No. 7,938,284, the clamshells may be filled and closed and stored with untreated seed, with seed treatment then being later applied. Injection may be accomplished by several methods, all of which were determined not to interfere with the re-opening of the clamshell container during planting as described in U.S. Pat. No. 8,639,383, and the treatment in the container allowed even coating of the seed treatment. The seed treatment system described herein may be adapted for use with the research seed system as shown in U.S. Pat. No. 11,304,356.

The device may further comprise a recirculation system to reduce waste of seed treatment products, which system pumps excess seed treatment product from the needles into a recirculation tank. The cleansing of the injection needles further provides an accurate dosage measurement by the micro flowmeter and facilitates changing between seed treatment mixtures.

The apparatus, in one embodiment, comprises a conveying system, a two-scanner scanning system, a plurality of seed treatment tank units, and a bulk storage treatment tank unit, a recirculation tank unit, a plurality of injection needles, an agitator, and an inspection imaging system. The bulk storage tank unit includes a stir agitator and may include a level transmitter. A wash tank connects to the bulk storage tank along with a recirculation line comprising of a flow transmitter and, optionally, a viscosity sensor powered by a pump to transfer seed treatment. Flowmeters and pumps may connect a plurality of seed treatment product to the bulk storage tank to create a seed treatment mixture. In fluid communication with the bulk storage tank unit, the recirculation tank pumps seed treatment mixture to the injection needles controlled by a flow meter. Excess seed treatment mixture returns to the recirculation tank unit to stir until use.

The containers are scanned by the scanning system, which in some embodiments comprise a bar code scanner and time of flight scanner. The bar code scanner determines seed treatment dosage by receiving data from a controlled data base. The time-of-flight scanner measures the box shape to ensure each container enters the apparatus in correct orientation and position. The time of flight sensor can check for one or more of container orientation, presence/absence, container height and position, and if containers are too damaged to properly be injected. A traditional camera could similarly be used in addition to or instead of the time of flight scanner. The containers may be transported by a conveyor system. The conveying system positions a row of containers and at least one treatment injection needle in proximity to at least one container in the row. The injection needles pierce the containers in a location that will not obscure the identifying label on the container. In some embodiments, the injection site is on the opposite side of the identifying label, so that any seed treatment that is released outside of the injection site, whether before or after injection, will not interfere with the identifying label.

Following the injection, the containers may be agitated to evenly distribute the seed treatment in the containers. The agitator may be a rotary or oscillatory method controlled by sensors. The sensors may receive calibrated speeds and times based on the bar code scanners data. Following agitation, the inspection system consists of a circuit board with LEDs to illuminate the container bodies. A container removal device separates the containers that did not pass verification.

An advantage and feature of the apparatus and method is reduction of waste of the seed treatment product. Seeds are sorted into the containers with predetermined seed treatment product dosages defined by the box barcode. By adjusting the amount of seed treatment product injected from the recirculation tank, waste of excess seed treatment product is minimized. The recirculation system cleans the lines when needed to conserve seed treatment product and ensure accurate readings on the micro flow meter.

Another advantage and feature of the apparatus is the accuracy of the injection needles. Seed treatment product is injected into the containers controlled by a micro flow meter and pump. Each individual injection is monitored and verified at the end of the process by the inspection system.

The apparatus allows for custom treatment of variable batches of seed, and is particularly useful when small numbers of containers require different seed treatments and so treatment by batch after loading the container with seed is useful. It is also more convenient and reduces waste and clean out time to load the container with untreated seed and apply the seed treatment mixture directly into the package.

In one embodiment, the apparatus enables the practice of a method of custom treating seeds in a container with a seed treatment apparatus by injection, the method comprising: storing a plurality of seed treatment products in a plurality of seed treatment tank units; mixing the seed treatment products in a bulk storage treatment tank unit with specifically measured amounts of each seed treatment product;

3 injecting the seed treatment mixture into the containers; and agitating the plurality of containers to evenly distribute the seed treatment mixture. In another embodiment, the method further comprises use of a recirculation unit, the method comprising: storing a plurality of seed treatment products in a plurality of seed treatment tank units; mixing the seed treatment products in a bulk storage treatment tank unit with specifically measured amounts of each seed treatment product; moving the seed treatment mixture from the bulk storage treatment tank unit to a recirculation tank unit; pumping the seed treatment mixture from the recirculation tank unit through one or more fluid transfer lines into a plurality of injection needles that inject the seed treatment mixture into the containers; following injection, recirculating any seed treatment mixture not injected into the container returns back to the recirculation tank unit; and agitating the plurality of containers to evenly distribute the seed treatment mixture.

In another embodiment, the method and apparatus may comprise a conveying system that positions a row of the containers and at least one treatment injection needle per container in proximity to each other. In some embodiments, there may be more than one needle per container in the row. When more than one needle per container is used, treating with multiple seed treatment types or blends can be conducted simultaneously, without requiring the use of a mixing tank. In some embodiments, the container comprises an identifying label on the exterior of the container, and the injection needle pierces the container away from the identifying label. In some embodiments the method and system may facilitate treatment changeover by reversing flow back into the bulk storage treatment tank unit, purging with inert fluid, and priming system with new fluid. In some embodiments, an inspection imaging system verifies the even distribution of the seed treatment mixture on each seed by imaging through the sides of the container.

In some embodiments, the apparatus comprises a plurality of seed treatment tank units in fluid communication with a bulk storage treatment tank unit, wherein the bulk storage treatment tank unit is in further fluid communication with at least one seed treatment injection needle that injects seed treatment mixture into the container, and an agitator to evenly distribute the seed treatment mixture on each seed in the container after injection. In yet other embodiments, the apparatus further comprises a recirculation system, wherein: the bulk storage treatment tank unit is in further fluid communication with a recirculation tank unit, and the recirculation tank unit is in fluid communication with at least one treatment injection needle that injects seed treatment mixture into a container, and any seed treatment mixture not injected into the container is returned back to the recirculation tank unit. Continued recirculation of the treatment mixture can prevent drying out or clogging of material in the fluid system.

In some embodiments, the container comprises an identifying label on the exterior of the container, and the injection needle pierces the container away from the identifying label. Not only is this useful for preventing direct interference with the readability of the identifying label to avoid direct readability, but for any identifying label it also prevents any seed treatment residue that may collect near the injection site, which is typically brightly colored, from obscuring the readability of the label.

In some embodiments, the container is a resealable container, and the apparatus comprises an opener that opens the container prior to injecting the seed treatment mixture into the container, in a manner that does not require puncturing the container, and a resealer that reseals the container following the injection of the seed treatment into the container.

In some embodiments, the apparatus further comprises a conveying system that positions a row of the containers and at least one treatment injection needle in proximity to at least one container in the row. The conveying system may further comprise a conveyor with automated stops and positioners. The conveying system may align rows or arrays of containers with injection needles to increase throughput. In embodiments with an array of treatment injection needles, the array of treatment injection needles would match the array size of the seed container holding tray or cassette.

In some embodiments, multiple treatments spanning different time periods could be applied to the seeds in the containers. For example, the seed in the containers may first treated with a fungicide or insecticide, with a second treatment with a biological seed treatment closer to the planting date, because, for example, the biological seed treatment has a shorter shelf-life and/or cannot be applied with the other seed treatments due to the negative effects of the fungicide or insecticide on the viability of the biological seed treatment.

In some embodiments the apparatus further comprises a scanning system. The scanning system may comprise one or more scanners. One scanner may read the identifying label, such as an optical code, to determine the seed treatment mixture for that container. One scanner may be time of flight scanner that can help determine and place the injection needle.

In some embodiments, the apparatus further comprises a flow transmitter between the seed treatment tank unit and the bulk storage treatment tank unit. In some embodiments, the bulk storage treatment tank unit further comprises a viscosity sensor. The viscosity sensor may be positioned between the bulk storage treatment tank unit and a diverting valve, and the seed treatment mixture from the bulk storage tank unit may be directed either back to the bulk storage treatment tank unit or to a recirculation tank unit. Instead of or in addition to a diverting valve, different multi-port valves (mixing, selecting, diverting) or general flow control valves may be used.

In some embodiments, the apparatus comprises a system to wash out the fluid lines when seed treatment mixture changes are made in the fluid lines. In some embodiments, the apparatus comprises a wash tank unit comprising inert fluid used to wash out the fluid lines. In some embodiments, the wash tank unit is in fluid communication with one or more of the bulk storage treatment tank unit, the recirculation tank, and the injection needles.

In some embodiments, the recirculation tank unit comprises an agitator or stirrer to maintain the equal suspension of the seed treatment mixture. In some embodiments, agitation or stirring may be continuous. In some embodiments the recirculation tank is in fluid communication with an injection needle. In some embodiments, a micro flowmeter is used to provide a predetermined dose range of treatment product to be injected by each injection needle into the container. In some embodiments, the injection needle is within the range of 12-20 gauge.

In some embodiments, a rotary external geared agitator is used, and which rotary external geared agitator may be set to rotate at an angular velocity within the range of 30-100 rpm and set time within the range of 30-120 seconds. In some embodiments, an inspection imaging system that verifies the even distribution of the seed treatment mixture on each seed by imaging through the sides of the container.

BRIEF DESCRIPTION OF THE DRAWINGS

The disclosure can be more fully understood from the following detailed description and the accompanying drawings and Sequence Listing, which form a part of this application.

DETAILED DESCRIPTION

Figure 1:
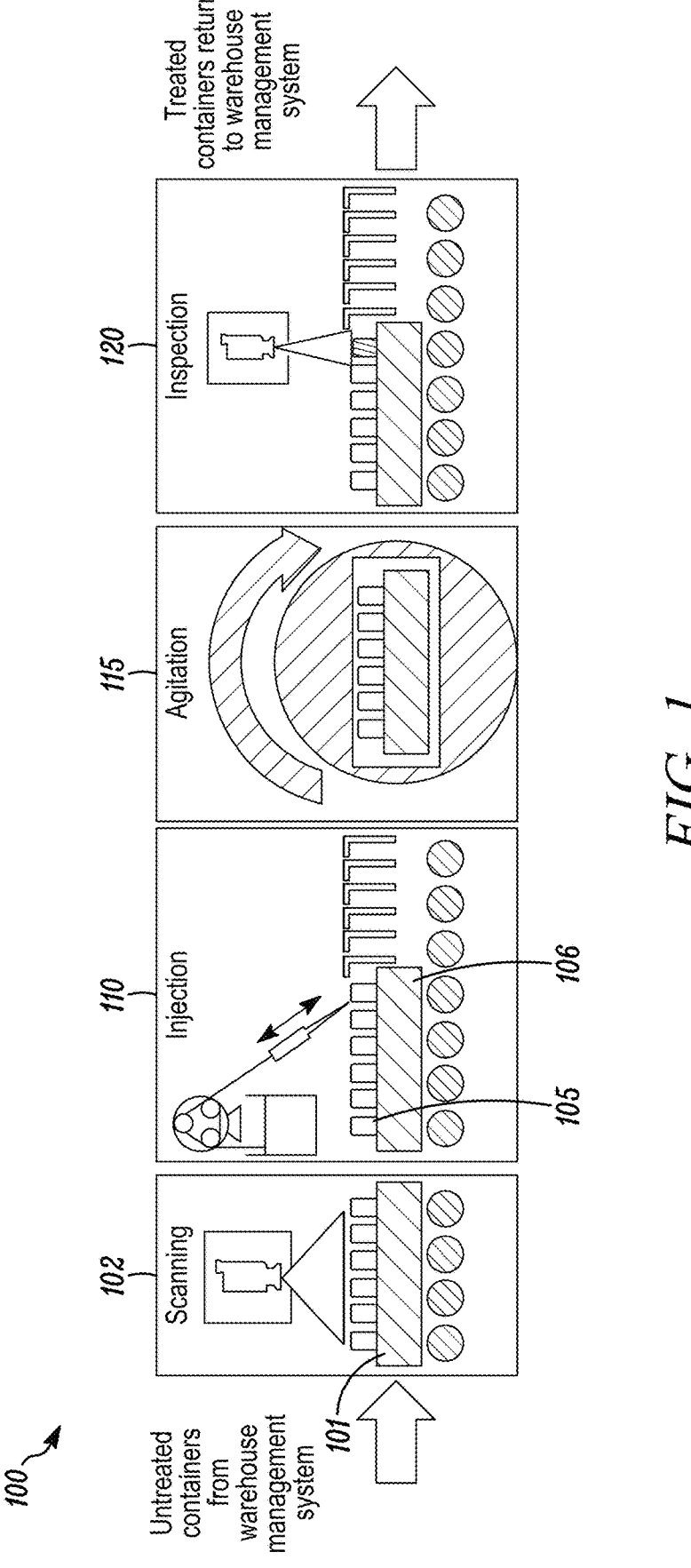
FIG. 1 depicts a model of process steps taken to inject containers to coat seeds with seed treatment product according to an embodiment of present invention.
Figure 2:
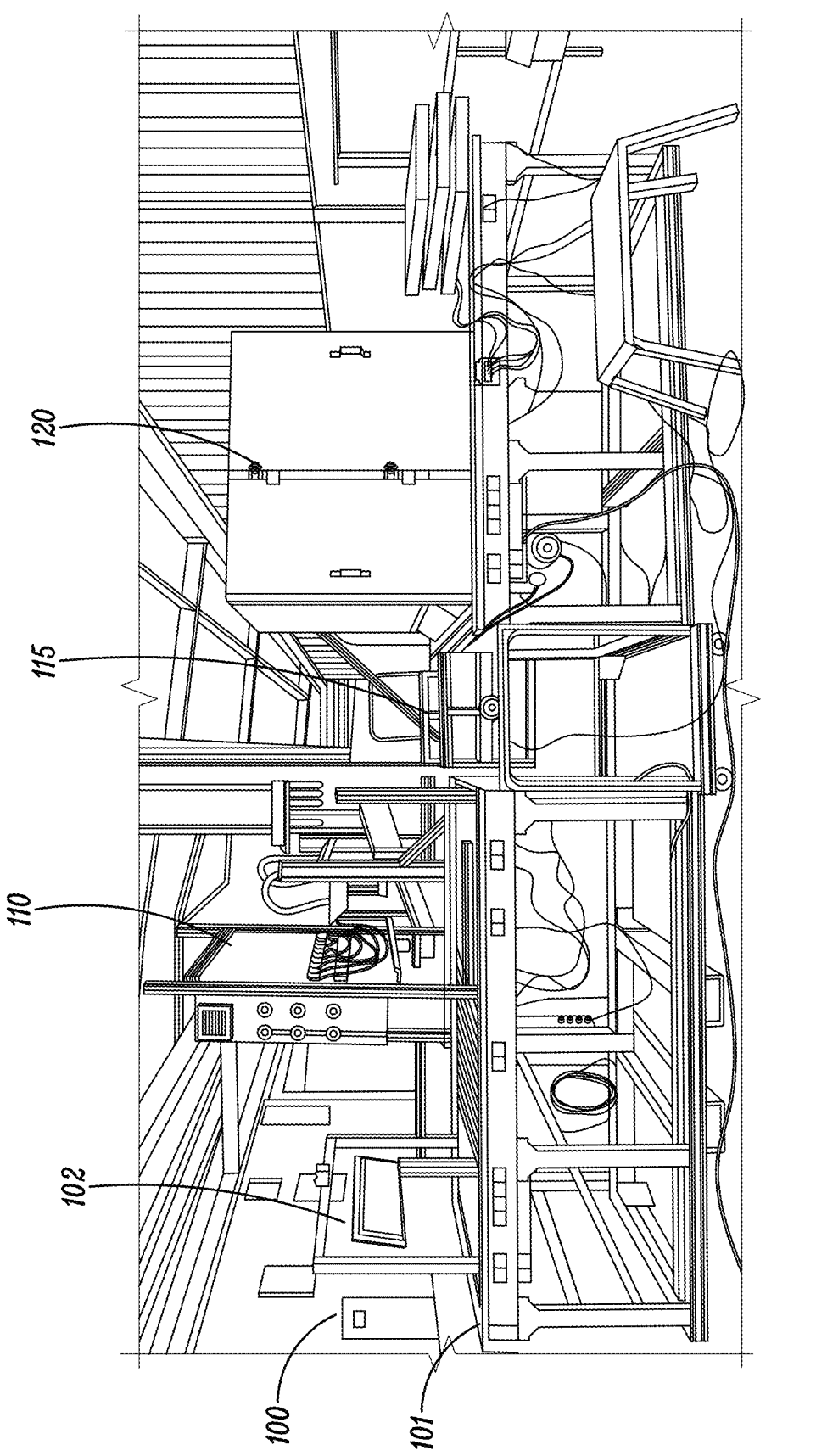
FIG. 2 depicts a side view of a portion of a container seed treatment apparatus according to an embodiment of the present invention.

A container seed treatment apparatus 100 according to the present invention may be assembled onto a frame assembly line. Referring to FIGS. 1 and 2, container seed treatment apparatus 100 can include a conveying system 101, a scanning system 102, an injection system 110, and agitation system 115, and an inspection system 120. The scanning system 102 can comprise at least two different scanners, in this embodiment, a bar code scanner 103 and time of flight scanner 104. The scanning system may be connected to a data system (not shown) that provides the seed treatment apparatus 100 with information about how to treat a container 105 or group of containers 105. This information may include one or more of information about the amount of seed treatment or seed treatment mixture to apply, the type of seed treatment or seed treatment mixture to apply, and specifications for creating seed treatment mixtures using the various components of the seed treatment apparatus described herein. The conveyor system can move a plurality of container 105 throughout the apparatus. The containers can be transported in a box container 106.

The seeds in the container may be any type of seed, including but not limited to corn seeds, soybean seeds, sorghum seeds, wheat seeds, sunflower seeds, rice seeds, alfalfa seeds and canola seeds. The container seed treatment apparatus 100 and associated containers may be scaled up or down in size as needed to handle different size seeds.

Figure 3:
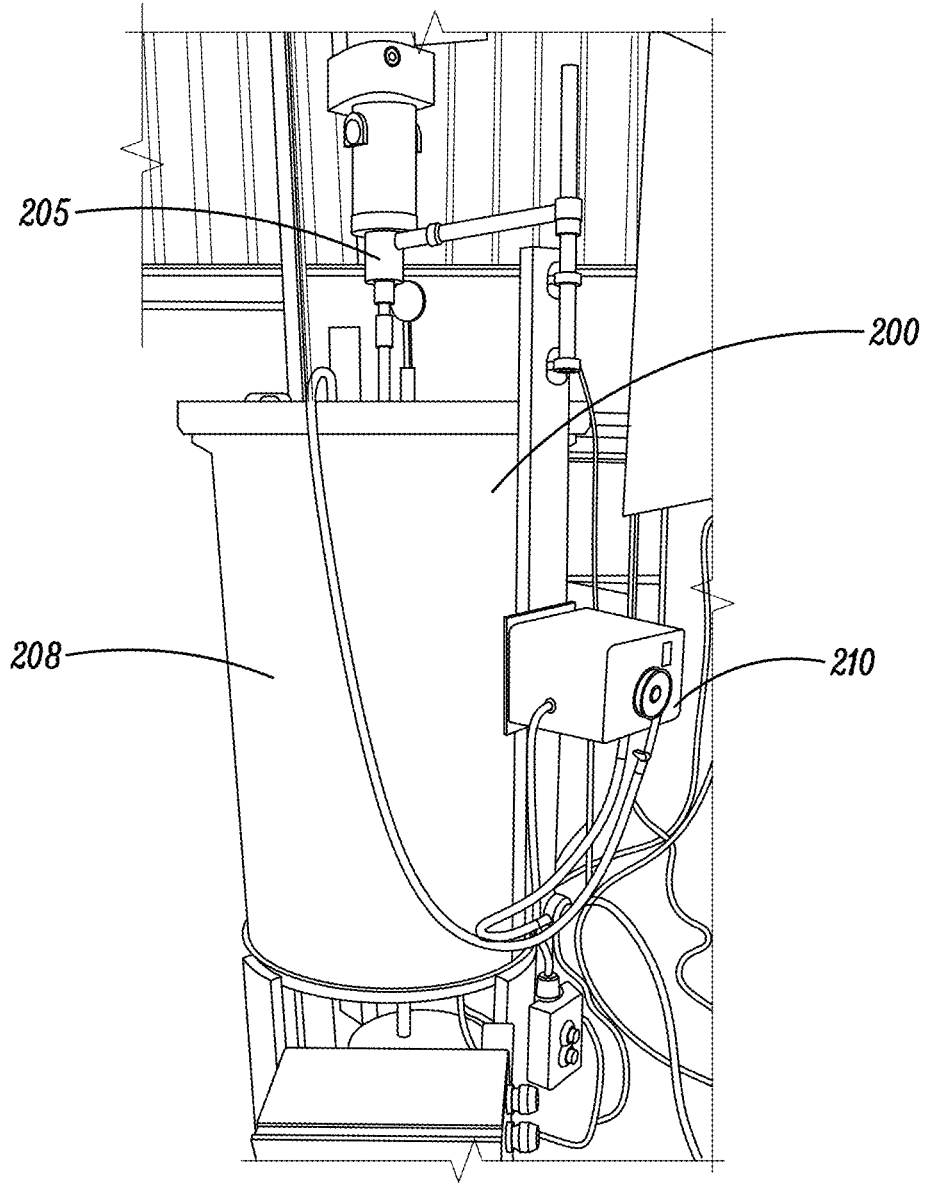
FIG. 3 depicts a side view of a bulk storage tank unit product according to an embodiment of present invention.
Figure 4:
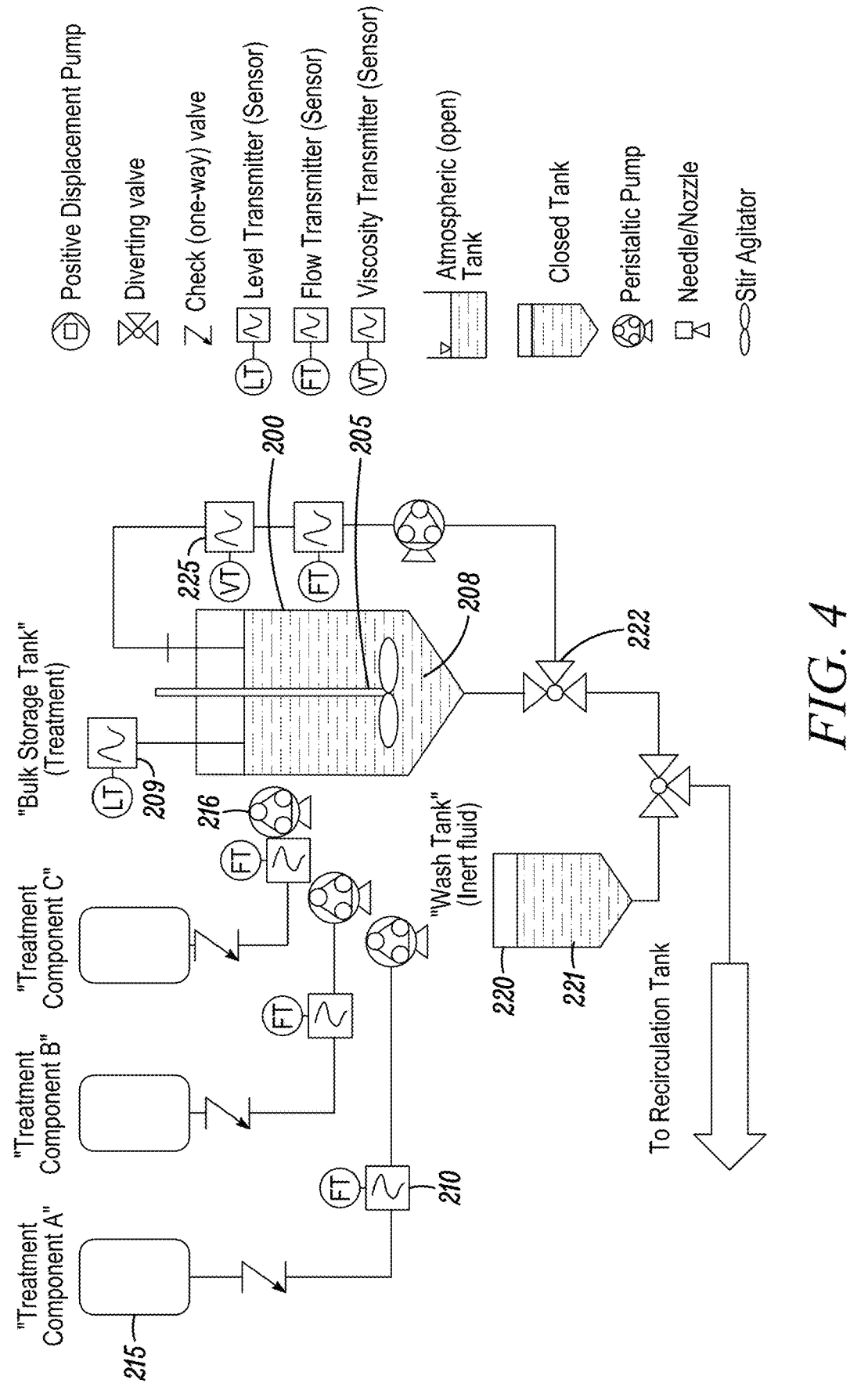
FIG. 4 depicts a schematic of a bulk storage tank unit system according to an embodiment of present invention.

FIGS. 3 and 4 depict a bulk storage treatment tank unit 200 full of mixed seed treatment solution 208. A plurality of seed treatment tank units 215 connect to the bulk storage treatment tank unit 200 each controlled by a pump 216 and each monitored by a flowmeter 210. The seed treatment solution 208 can be stirred by a stirrer, such as a magnetic stirrer 205, and can be kept leveled by a level transmitter 209. The bulk storage treatment tank unit 200 can be connected to a diverting valve 222; one direction flows back into the bulk storage treatment tank 200 possibly flowing through a pump 216, flowmeter 210, and viscosity sensor 225. The other direction can be connected a second diverting valve 222. The second diverting valve can be in connection to a wash tank 220 filled with inert fluid 221 and a recirculation tank system 300. The inert fluid 221 may be used to wash out the system between use of different seed treatment mixtures or to enable cleanout of the system for storage or inactivity. Some chemically inert fluids that may be used include, but are not limited to perfluorohexane, water, and peroxyacetic acid based cleaning solutions. Viscosity sensors that may be used include but are not limited to an inline viscosity meter with low shear rates.

Any type of seed treatment may be used, including without limitation, fungicides, insecticides, inoculants, plant growth regulators, fertilizers and fertilizer enhancers, any or all of which may be stored in the seed treatment tank units 215 and individual treatments or combinations thereof may be added to the bulk storage treatment tank unit 200. Specific seed treatments are known in the art, and reference is made to Sittig's Handbook of Pesticides and Agricultural Chemical, second edition, edited by Richard Pohanish, William Andrew Publishing (Elsevier). 2015, the contents of which are incorporated by reference herein.

Figure 5:
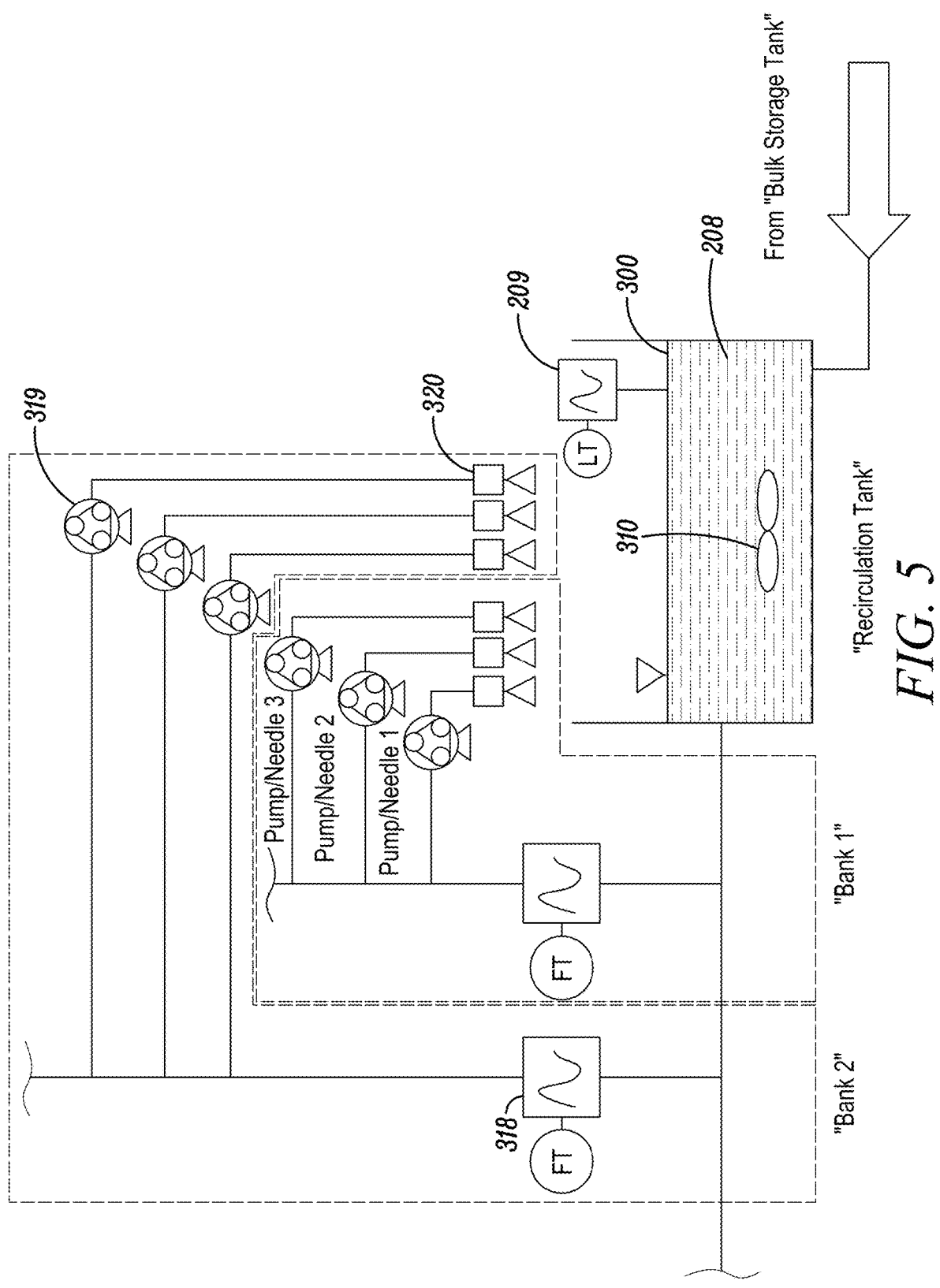
FIG. 5 depicts a schematic of a recirculation tank unit system connecting to the injection needles according to an embodiment of present invention.
Figure 6A:
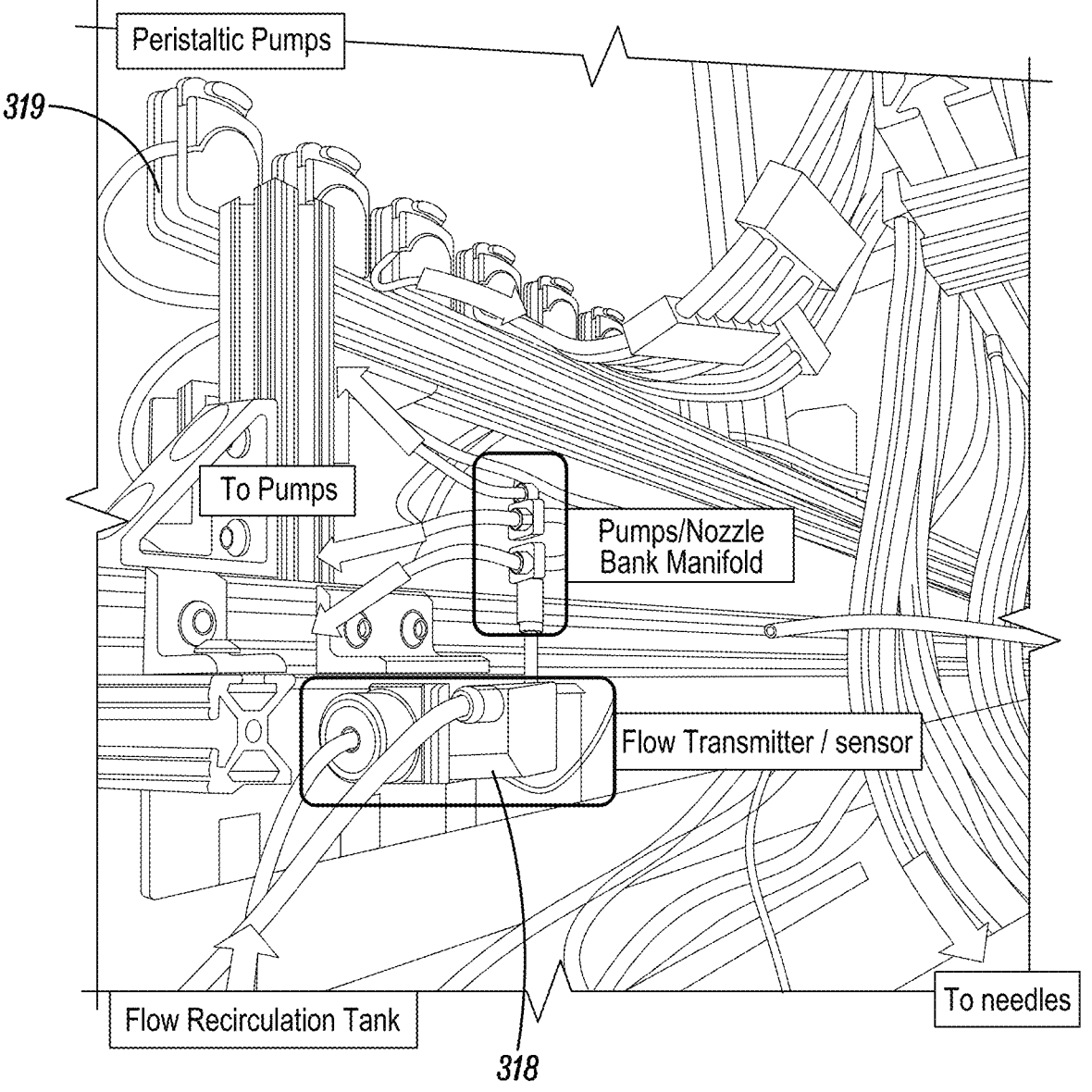
FIG. 6A depicts a partial view of an injection system according to an embodiment of present invention.
Figure 6B:
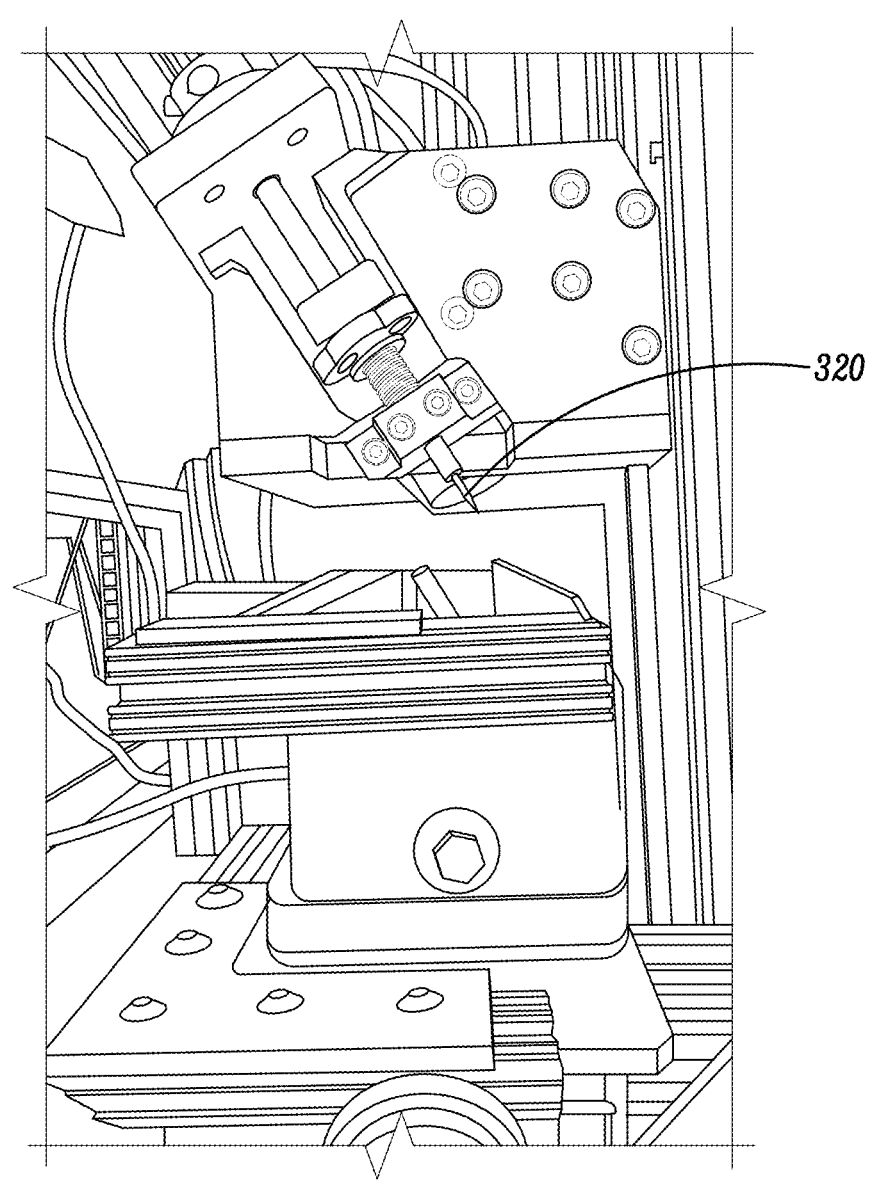
FIG. 6B depicts a partial view of an injection needle according to an embodiment of present invention.

FIGS. 5, 6A, and 6B depict the recirculation tank unit 300 in connection to the injection system. The mixed seed treatment solution 208 can be continuously stirred by a second magnetic stirrer 205, although any type of stirrer may be used, and can be monitored by a second level transmitter 209. Mixed seed treatment solution 208 stored in the recirculation tank unit 300 can be controlled by a flow transmitter 318 to be pumped 319 into a plurality of injection needles 320. In an optional embodiment, the recirculation tank need not be used and the bulk storage tank 200 may be fluidly connected to the injectors.

Figure 7B:
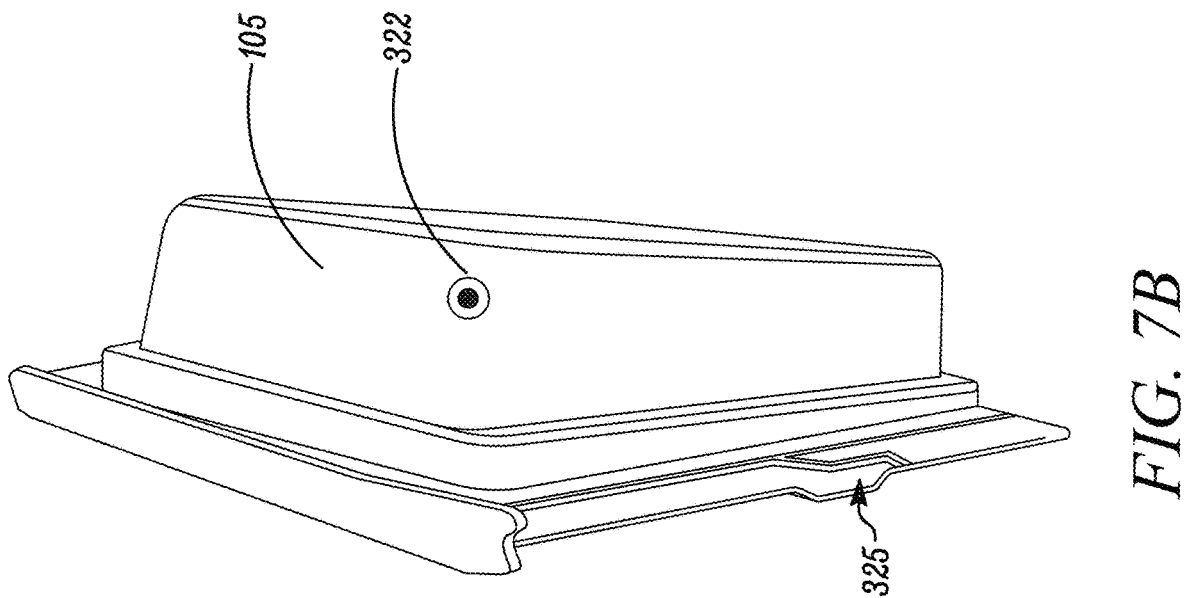
FIG. 7B depicts a container following injection, with this embodiment showing the point of injection in the corner of the removably container.
Figure 7A:
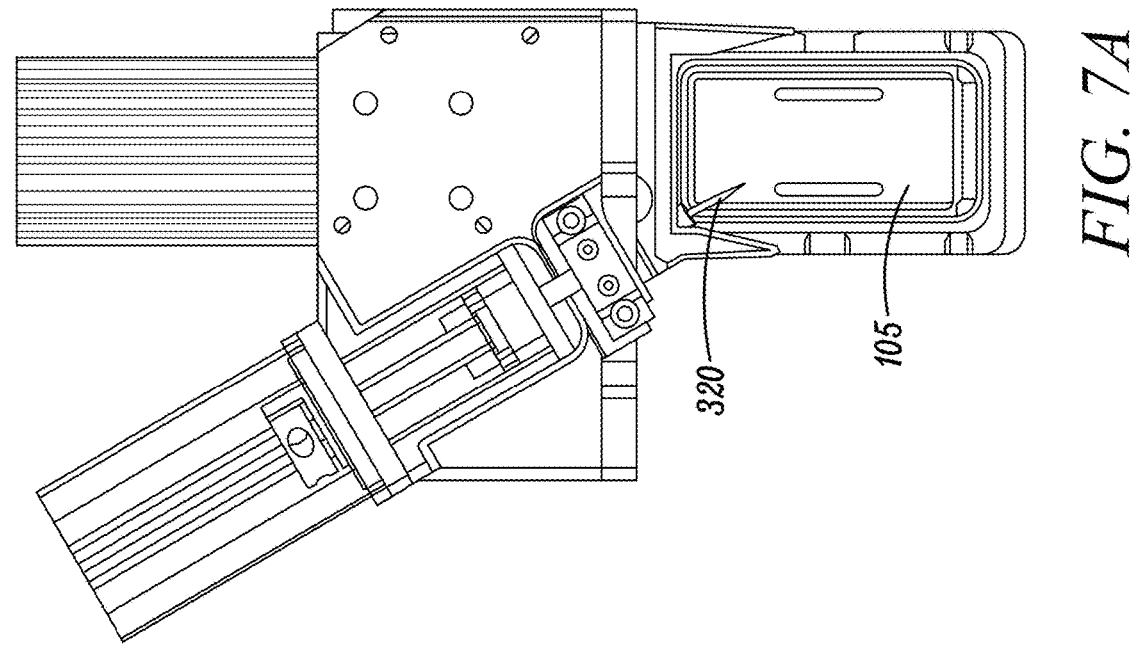
FIG. 7A depicts a partial view of an injection needle according to an embodiment of present invention.

FIG. 7A depicts an embodiment with an injection needle 320 that pierces the container 105 at an injection point 322 in the upper corner. FIG. 7B shows a container 105 that has been pierced by the injection needle 320. One feature of the specific sealed clamshell container 105 used in this embodiment is that it may be opened and resealed many numbers of times, and is designed to be easily automatically opened and closed as part of an assembly line and by a planter during planting the seeds stored in the container 105. Therefore, in one embodiment of this invention, the container may be opened prior to inserting the seed treatment mixture 208 into said container and resealed following the addition of the seed treatment mixture 208 and prior to agitation. This allows for filling of the container without the creation of a puncture site. In such embodiment, the injection needle need not have a sharpened end and may be fashioned more in the form of a syringe or a tube that can inject the seed treatment mixture 208 into the opened container 105. Thus, the term sealed container as used herein is inclusive of a container that may be opened and resealed any number of times, and need not be sealed at the time the seed treatment mixture 208 is added but in some embodiments is then sealed prior to agitation. Further, the term "needle" as used herein may refer generically to any gauge needle that can pierce the container wall, and is preferable a needle in the range of 12-20 gauge. The terms "inject" or "injection" as used herein generically refers to any method of releasing the seed treatment solution 208 into the container 105, whether such container is in a sealed state or an opened state, and may include delivery systems such as a needle, syringe, tube or sprayer. Injection may involve piercing the container wall with a needle, but also includes opening the container, injecting the seed treatment solution and resealing the container or injecting into a pre-formed container opening. One such pre-formed container opening may be a "duck-bill" 325 or spear opening, which could be utilized to inject the seed treatment without requiring piercing the container.

The apparatus may inject rows or entire arrays of containers in parallel in order to increase throughput efficiency. Further, when an injection needle 320 is used such that it punctures the container wall, it is preferable to pierce the container in a location away from an identifying label on the container, such as a bar code. Any barcode may be used, such as a linear or one-dimensional barcode or a matrix or two-dimensional barcode. In some embodiments a QR code is used.

Figure 8:
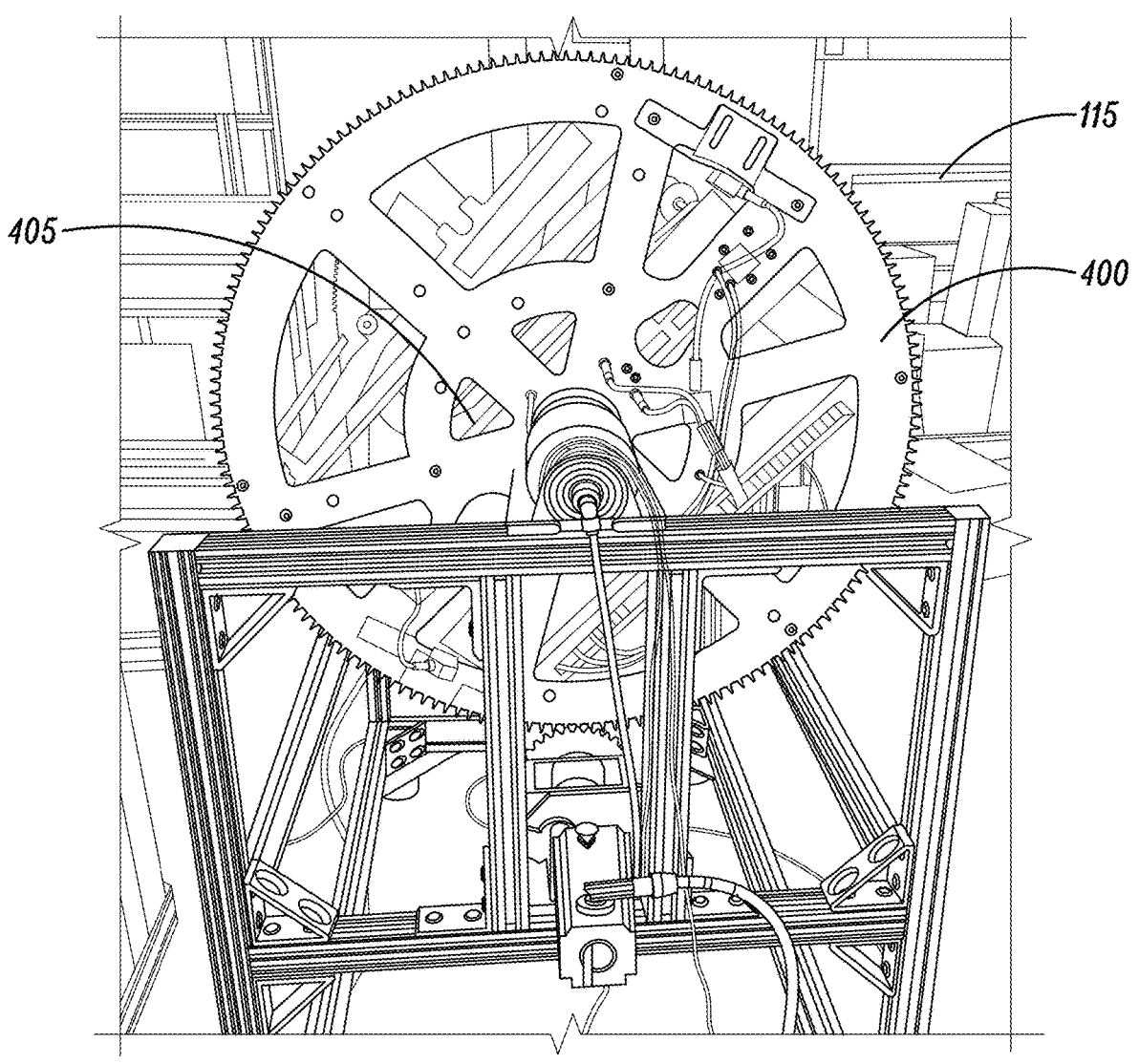
FIG. 8 depicts a side view of an agitation system according to an embodiment of present invention.

FIG. 8 depicts the agitation system 115. The agitation system 115 can be any type of agitator, and in one embodiment is a rotary geared agitator 400 that receives one or more rows of the containers 105. The containers 105 can be placed on a shelf 405 to be agitated. The agitation ensures the mixed seed treatment solution 208 evenly coats all of the seeds inside of the containers 105. Other agitation devices that may be used include but are not limited to shakers, rotators and mixers, and the types of movement include but are not limited to orbital and reciprocating. In an alternative embodiment, agitation may be achieved by agitating the seeds while in the container by injecting pressurized gas into the clamshell body through either the same injection needle 320 used to inject the seed treatment or through a separate needle or set of needles dedicated to this purpose. This provides agitation within the clamshell body without the need for downstream external agitation.

Figure 9:
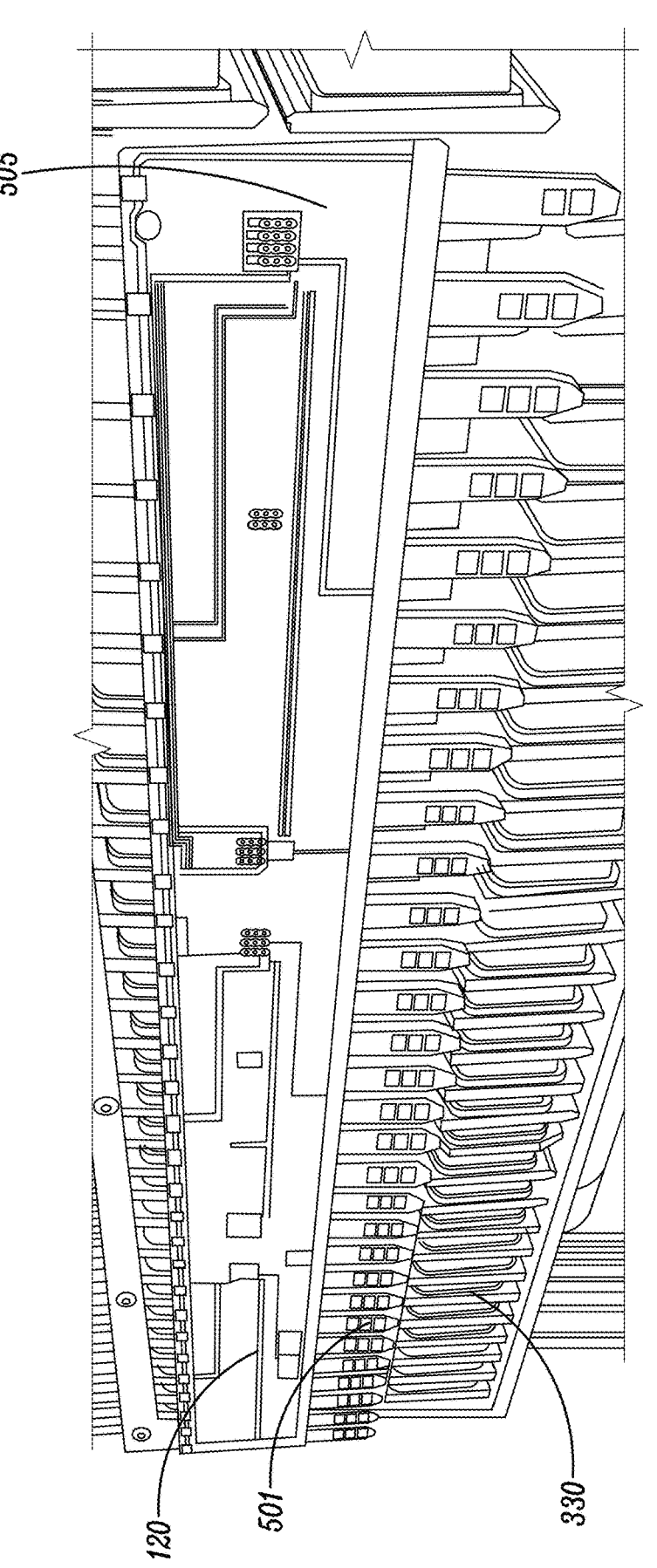
FIG. 9 depicts a side view of an inspection system according to an embodiment of present invention.
Figure 10:
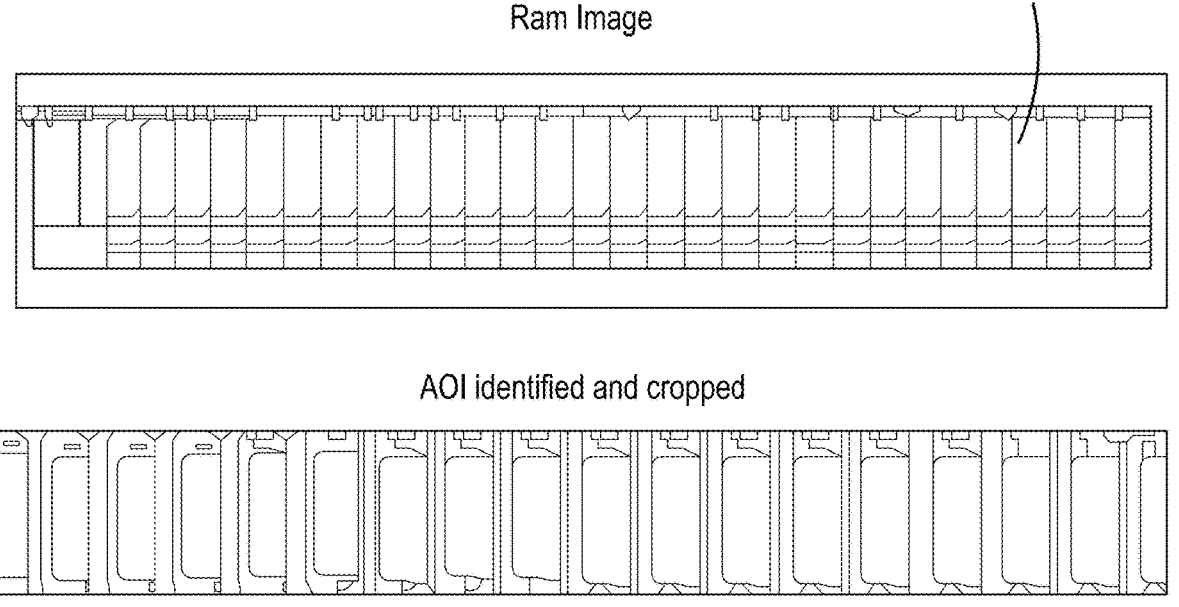
FIG. 10 depicts a detailed view of an inspection system's light identifiers according to an embodiment of present invention.

FIGS. 9 and 10 depict the inspection system 120. The containers 105 can be transported by the conveying system 101 through the inspection system 120. The system can comprise of a circuit board 505, sensors 501, camera, and lights 510 to optically scan the seeds inside the container 105 walls to verify the mixed seed treatment solution 208 is evenly distributed among the seeds. In one embodiment, the system is comprised of an LED circuit board and camera system. The circuit board is actuated to make contact or proximity between the LEDs and the container bodies. The LEDs illuminate the interior of the container through the translucent container walls. The camera system processes the image of the illuminated container to evaluate treatment distribution based on characteristics including but not limited to brightness, contrast, and color. The distribution of treatment on the container wall is indicative of distribution of treatment on the seeds inside the container. The results in FIG. 10 show the results of an experiment with a mix of positive and negative controls. In this experiment a raw image was generated (top portion), cropped using artificial intelligence (middle portion) and a color/pixel analysis was run on the cropped image (bottom portion). Optionally, the color/pixel analysis may be directly run on the raw image. Pixels are indicative of seed treatment, and so the images with the more even distribution of pixels showing on the container represent successful treatment with the apparatus and method. In one embodiment, the seed treatment apparatus comprises or is in further communication with a data system, and the results of the inspection system are transmitted and stored to in the data system.

Figure 11:
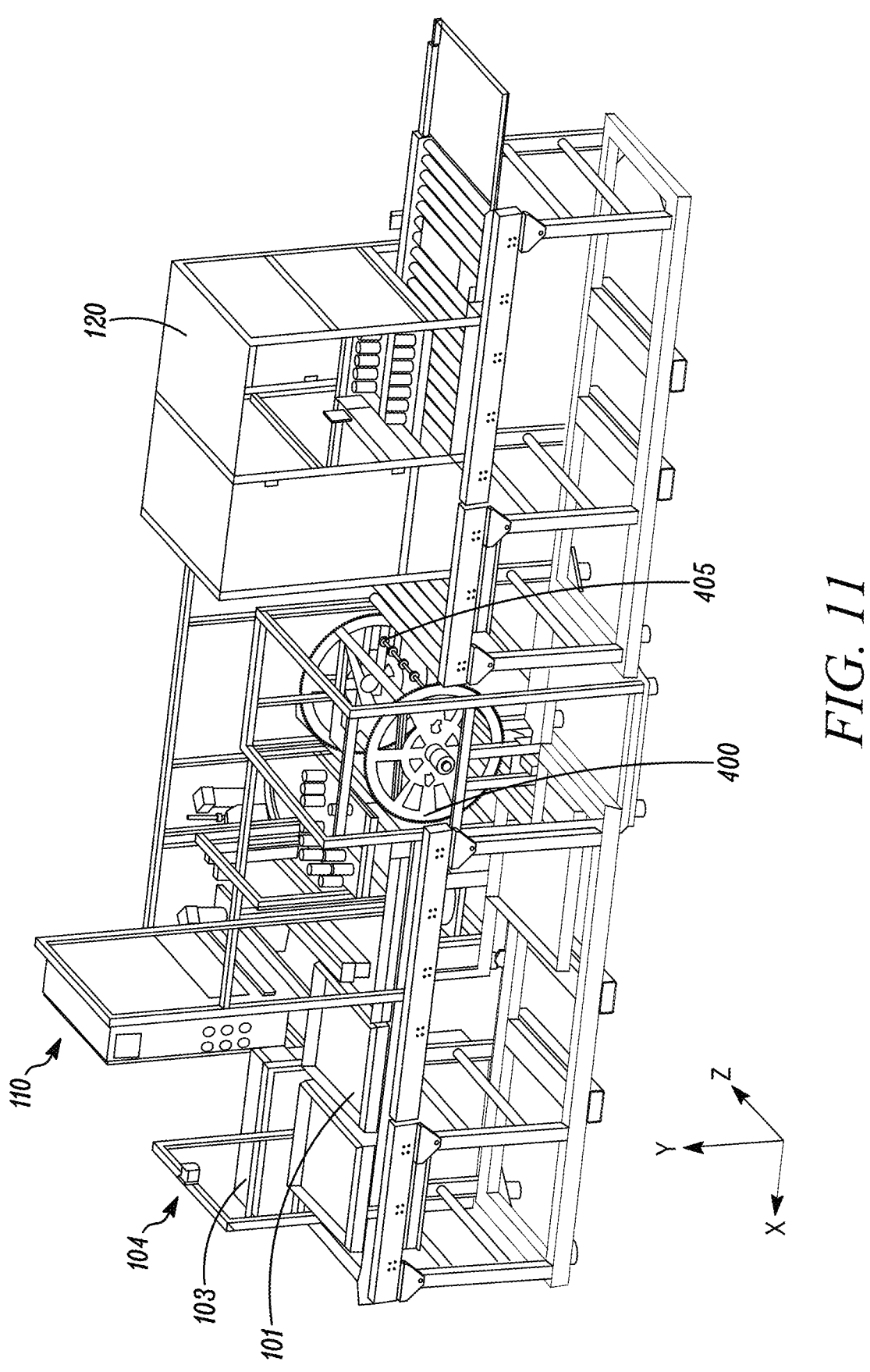
FIG. 11 depicts a side view of a container seed treatment apparatus according to an embodiment of present invention. Bulk storage tank 200 is not shown.

FIG. 11 depicts a possible final product of the seed treatment apparatus 100. The seed treatment apparatus 100 can be one fluid system connected by a conveying system 101.

Terms used in the claims and specification are defined as set forth herein unless otherwise specified. It must be noted that, as used in the specification and the appended claims, the singular forms "a," "an" and "the" include plural referents unless the context clearly dictates otherwise.

While the invention has been particularly shown and described with reference to a preferred embodiment and various alternate embodiments, it will be understood by persons skilled in the relevant art that various changes in form and details can be made therein without departing from the spirit and scope of the invention. For instance, while the particular examples below may illustrate the methods and embodiments described herein using a specific plant, the principles in these examples may be applied to any plant. Therefore, it will be appreciated that the scope of this invention is encompassed by the embodiments of the inventions recited herein and in the specification rather than the specific examples that are exemplified below. All cited patents and publications referred to in this application are herein incorporated by reference in their entirety, for all purposes, to the same extent as if each were individually and specifically incorporated by reference.

We claim:

1. A method of custom treating seeds in a seed filled clamshell container with a seed treatment apparatus by injection, the clamshell container to be used for planting the treated seeds, the method comprising:

storing a plurality of seed treatment products in a plurality of seed treatment tank units;

mixing the seed treatment products in a bulk storage treatment tank unit with specifically measured amounts of each seed treatment product;

injecting the seed treatment mixture into the seed filled clamshell containers; wherein the injection comprises at least one of:

piercing the seed filled clamshell container on the exterior of the seed filled clamshell container away from an identifying label affixed to the seed filled clamshell container, or opening the clamshell container with the apparatus and injecting the seed treatment mixture into the clamshell container in a manner that does not require puncturing the clamshell container or removing the seeds from the clamshell container, and resealing the treated seed in the clamshell container with the apparatus, and agitating the plurality of seed filled clamshell containers to evenly distribute the seed treatment mixture on the seeds inside the clamshell container.

2. The method of claim 1, further comprising a recirculation unit, the method comprising:

storing a plurality of seed treatment products in a plurality of seed treatment tank units;

mixing the seed treatment products in a bulk storage treatment tank unit with specifically measured amounts of each seed treatment product;

moving the seed treatment mixture from the bulk storage treatment tank unit to a recirculation tank unit;

pumping the seed treatment mixture from the recirculation tank unit through one or more fluid transfer lines into a plurality of injectors that inject the seed treatment mixture into the seed filled clamshell containers;

following injection, recirculating any seed treatment mixture not injected into the seed filled clamshell container so that the seed treatment mixture not injected returns back to the recirculation tank unit; and agitating the plurality of seed filled clamshell containers to evenly distribute the seed treatment mixture.

3. The method of claim 1, wherein a conveying system positions a row of the seed filled clamshell containers proximal to a row of injection needles.

4. The method of claim 3, wherein the seed filled clamshell container is pierced with an injection needle.

5. The method of claim 1, wherein the seed filled clamshell container or a group of seed filled clamshell containers entering the seed treatment apparatus comprise an identifying label, wherein the identifying label is read by the scanning system and associated with a database identifying the seed treatment mixture to apply to that container or group of containers, and the seed treatment apparatus injects that seed treatment mixture into that container or group of containers.

6. The method of claim 1, further comprising a seed treatment changeover by reversing flow back into the bulk storage treatment tank unit, purging with inert fluid, and priming system with new fluid.

7. The method of claim 1, wherein an inspection imaging system verifies the even distribution of the seed treatment mixture on each seed by imaging through the sides of the seed filled clamshell container.

8. The method of claim 7, where the verified results associated with an individual seed filled clamshell container is reported to a data system.

9. A clamshell container seed treatment apparatus, comprising:

a plurality of seed treatment tank units in fluid communication with a bulk storage treatment tank unit, wherein the bulk storage treatment tank unit is in further fluid communication with at least one seed treatment injector that injects a seed treatment mixture into a seed filled clamshell container used for planting the treated seeds, wherein the seed filled clamshell container comprises at least one of:

an identifying label on the exterior of the seed filled clamshell container, wherein the identifying label is positioned so that it is not pierced by the seed treatment injector, or an identifying label on the exterior of the seed filled clamshell container, and wherein the container is a resealable container and the apparatus comprises an opener that opens the container prior to injecting the seed treatment mixture into the container in a manner that does not require puncturing the container, removing the seeds from the container, or piercing the identifying label, and an agitator to evenly distribute the seed treatment mixture on each seed in the container after injection.

10. The apparatus of claim 9 further comprising a recirculation system, wherein:

the bulk storage treatment tank unit is in further fluid communication with a recirculation tank unit, and the recirculation tank unit is in fluid communication with the at least one seed treatment injector that injects seed treatment mixture into the seed filled clamshell container, and any seed treatment mixture not injected into the seed filled clamshell container is returned back to the recirculation tank unit.

11. The apparatus of claim 10, wherein the seed treatment mixture in the recirculation tank unit is agitated or stirred.

12. The apparatus of claim 10, wherein the recirculation tank is in fluid communication with the injector.

13. The apparatus of claim 12, wherein the injector is a needle within the range of 12-20 gauge.

14. The apparatus of claim 9, wherein the seed treatment injector is an injection needle that pierces the seed filled clamshell container away from the identifying label.

15. The apparatus of claim 9, further comprising a scanning system that reads an identifying label on a container or a group of containers entering the seed treatment apparatus, wherein the identifying label is read by the scanning system and associated with a database identifying at least one of the amount or type of seed treatment mixture to apply to that container or group of containers, and the seed treatment apparatus is configured to inject the at least one amount or type of seed treatment mixture into the container or group of containers.

16. The apparatus of claim 9, wherein the apparatus further comprises a resealer that reseals the treated seed in the container following the injection of the seed treatment into the container.

17. The apparatus of claim 9, further comprising a conveying system that positions a row of the seed filled clamshell containers proximal to a row of injectors.

18. The apparatus of claim 17, wherein the conveying system comprises a conveyor with automated stops and positioners that secure the row of the seed filled clamshell containers prior to injection of each container with a needle.

19. The apparatus of claim 9, further comprising a scanning system, wherein the scanning system comprises at least one time of flight scanner.

20. The apparatus of claim 9, wherein each seed treatment tank unit comprises a flow transmitter between the seed treatment tank unit and the bulk storage treatment tank unit.

21. The apparatus of claim 9, wherein the bulk storage treatment tank unit further comprises a diverting valve, and the seed treatment mixture from the bulk storage tank unit may be directed either back to the bulk storage treatment tank unit or to a recirculation tank unit.

22. The apparatus of claim 21, wherein the bulk storage treatment tank unit is in fluid communication with a wash tank unit comprising inert fluid used to wash out the fluid lines.

23. The apparatus of claim 9, wherein the seed treatment injector is a needle that injects a predetermined dose range of treatment product measured by a micro flowmeter.

24. The apparatus of claim 9, further comprising a rotary external geared agitator, wherein the rotary external geared agitator rotates at an angular velocity within the range of 30-100 rpm and set time within the range of 30-120 seconds.

25. The apparatus of claim 9, further comprising an inspection imaging system that verifies the even distribution of the seed treatment mixture on each seed by imaging through the sides of the seed filled clamshell container.

26. The apparatus of claim 25, further comprising a data system, and wherein the results of the inspection imaging system are reported to the data system.

* * * * *